March 15, 1955 J. W. BANCROFT 2,703,982
FUEL QUANTITY MEASUREMENT
Filed Aug. 24, 1951
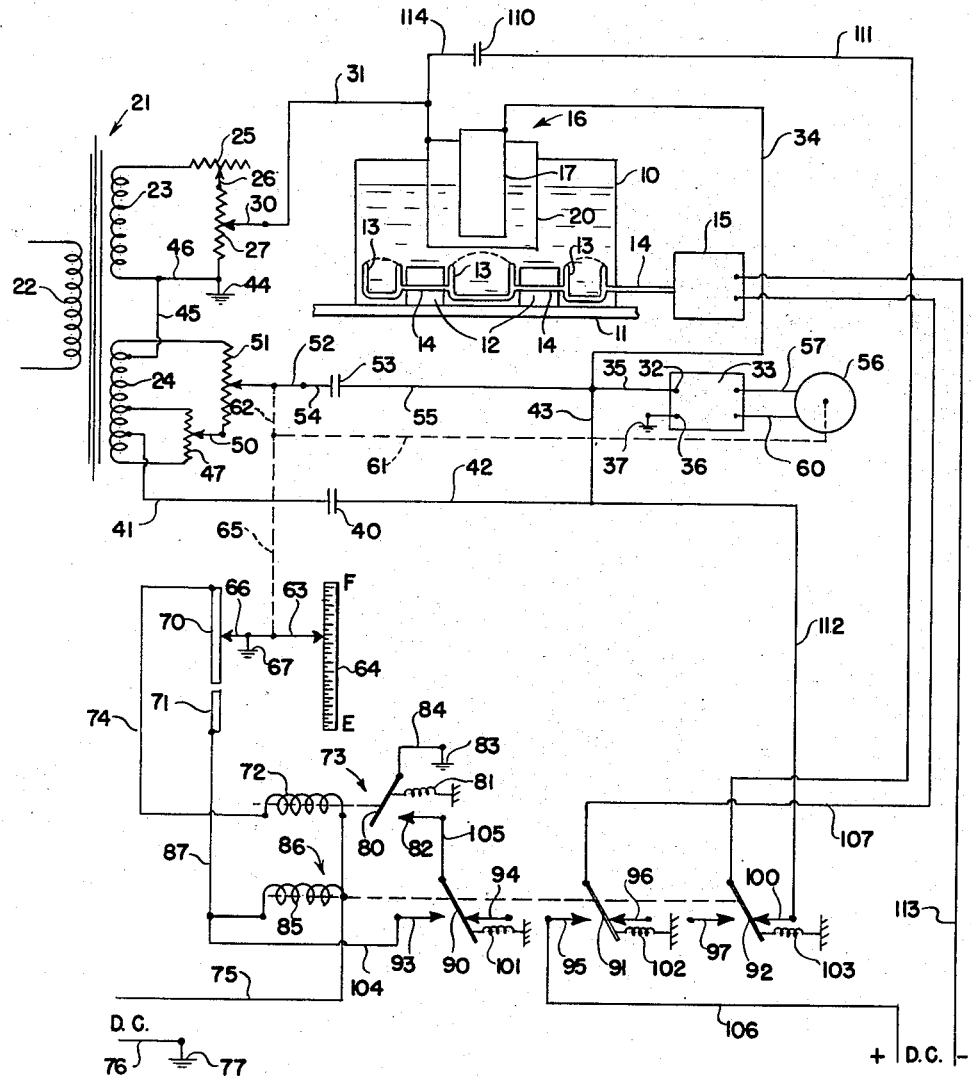
INVENTOR.
JOHN W. BANCROFT
BY George H Fisher
ATTORNEY

United States Patent Office 2,703,982
Patented Mar. 15, 1955

2,703,982

FUEL QUANTITY MEASUREMENT

John W. Bancroft, Minneapolis, Minn., assignor to Minneapolis-Honeywell Regulator Company, Minneapolis, Minn., a corporation of Delaware Application August 24, 1951, Serial No. 243,416

8 Claims. (Cl. 73—304)

This invention is concerned generally with liquid quantity measurement and more particularly with measurement of liquid quantity in containers of such shape that the measuring probes cannot be extended to the bottoms of the containers. Such containers may be fuel tanks for aircraft which are positioned in the wings of the craft. Because of strengthening spars supporting the bottom of the wing a fuel tank so shaped as to include virtually the entire area within the wing will have its bottom surface along the bottom surface of the wing and over the spars and so will not be smooth or even. A capacitance type of measuring probe has been found to be the most accurate type of measuring probe and because of the close spacing of the spars it is often difficult if not impossible to extend the capacitance probe to the very bottom of the tank. Also, special means would have to be provided to make the fuel located between the spars usable, such as by connecting the lower portions of the tank to each other by connections through the spars or by raising the effective bottom surface of the tank after a certain amount of fuel has been used, such as by inflatable tubes, so that the effective bottom surface of the tank is raised to the upper level of the spars. It is with this latter means of making use of all the fuel in the tank that the present invention is concerned. It is therefore an object of this invention to design new and improved apparatus for providing an indication of the total amount of fuel in a tank having areas containing fuel which cannot actually be measured.

Another object of the invention is to design compact and lightweight apparatus for providing an indication of the total amount of fuel in a tank having areas containing fuel which cannot actually be measured.

A further object of the invention is to design apparatus having a minimum number of additional components and making use of already existing equipment for providing an indication of the total amount of fuel in a tank having areas containing fuel which cannot actually be measured.

A further object of the invention is to design control apparatus for use with inflatable bladders positioned in the bottom of fuel tanks between structural members for inflating the bladders upon the level of the fuel being lowered to a predetermined level.

Another object of the invention is to design measuring apparatus for use with inflatable bladders positioned in the bottom of a fuel tank between structural members for providing an indication of the total quantity of fuel in the tank even though the fuel in the tank between the structural members is unmeasurable while the bladders are deflated.

Briefly, the apparatus comprising the invention involves the use of a capacitor providing a signal indicative of the quantity of the fuel in the bottom of the tank between the wing spars when the bladders are deflated. When the fuel level falls below a predetermined level this capacitor is cut out of the circuit and at the same time an energizing circuit is completed for inflating the bladders and raising all the fuel up above the level of the wing spars so that it is all measurable by the capacitance tank unit or probe. On refueling, when the fuel level reaches a predetermined height, the energizing circuit for inflating the bladders and maintaining them inflated is broken and the bladders are permitted to deflate. At the same time, the capacitor giving an indication of the quantity of fuel then contained between the wing spars is connected back into the measuring circuit.

For a more complete understanding of the invention reference is had to the following detailed description taken in conjunction with the accompanying drawing in which:

The single figure is a schematic diagram of the measuring and control apparatus comprising the invention.

The fuel, the quantity of which is to be measured, is contained in a tank 10 positioned inside a wing, shown to have a bottom surface 11, supported by a pair of wing spars 12. Inflatable bladders 13 are positioned between the spars 12. The bladders are shown to be connected together by pipes 14. One of the pipes 14 connects the bladders to an air pressure device 15 for inflating the bladders 13 upon the air pressure device being energized and for deflating the bladders when the air pressure device is deenergized.

A tank unit 16, having an inner electrode 17 and an outer electrode 20, is positioned in the tank 10 to measure the quantity of fuel in the tank. For the purpose of clarity the tank unit is shown out of proportion to the size of the tank. Tank unit 16 is a capacitive type of tank unit in which the two electrodes, 17 and 20, comprise a pair of plates of a capacitor with the fuel between the members comprising the dielectric. The air above the fuel and between the electrodes 17 and 20 comprises a further dielectric. As the dielectric constant of fuel differs from the dielectric constant of air by a ratio of approximately two to one, it is readily seen that the capacitance of tank unit 16 varies with rise and fall of fuel between the two electrodes 17 and 20.

Tank unit 16 is connected into a fuel quantity indicating apparatus such as is shown and described in an application to the same inventor bearing Serial No. 181,747, filed August 28, 1950 and assigned to the same assignee as the present invention. Briefly, the fuel quantity indicating apparatus is energized by a transformer 21 having a primary 22 connected to a source of alternating voltage, not shown. Transformer 21 further has a pair of transformer secondaries 23 and 24. A fine adjustment empty calibration rheostat 25, having a wiper arm 26, has one terminal connected to the upper end of transformer secondary 23. The wiper arm 26 of rheostat 25 is connected to one terminal of a rough adjustment empty calibration potentiometer 27, the other terminal of which is connected to the lower end of transformer secondary 23 by conductor 46. Potentiometer 27 has a wiper arm 30 to which outer electrode 20 of tank unit 16 is connected by means of a conductor 31. The inner electrode 17 of tank unit 16 is connected to an input terminal 32 of an amplifier 33 through conductors 34 and 35. The other input terminal 36 of amplifier 33 is connected to a ground terminal 37.

A capacitor 40 has one plate thereof connected to transformer secondary 24 near its lower terminal by means of a conductor 41. The other plate of capacitor 40 is connected to input terminal 32 of amplifier 33 through conductors 42, 43 and 35.

Transformer secondary 24 is connected near its upper terminal to the ground terminal 44 by means of conductors 45 and 46. The lower end of potentiometer 27 is also connected to ground terminal 44. Capacitor 40 is chosen to be of such magnitude that the signal indication from the capacitor 40, as measured across the input terminals of amplifier 33, is equal in magnitude but of opposite phase to the signal indication from tank unit 16 when tank 10 is empty.

A full calibration potentiometer 47, having a wiper arm 50, has one terminal thereof connected to the lower terminal of transformer secondary 24 while the other terminal of potentiometer 47 is connected to a point on transformer secondary 24 between its terminals. A rebalancing potentiometer 51, having a wiper arm 52, has one terminal thereof connected to the upper end of transformer secondary 24 while the other terminal is connected to wiper arm 50 of potentiometer 47.

A fuel quantity signal neutralizing capacitor 53 has one plate thereof connected to wiper arm 52 of rebalancing potentiometer 51 through a conductor 54 while the other plate of capacitor 53 is connected to input terminal 32 of amplifier 33 through conductors 55 and 35. Amplifier 33 is energized by a source of power, not shown.

Amplifier 33 is connected to a rebalancing motor 56 through conductors 57 and 60. Motor 56 is connected to wiper arm 52 of rebalancing potentiometer 51 through mechanical connections 61 and 62.

The manner in which the above described apparatus is calibrated is explained in the above mentioned application.

Let the condition first be assumed that a signal voltage of a given phase exists on the input terminals of amplifier 33. This would be due to a difference in magnitude of the signals from tank unit 16 due to the fuel in the tank and from capacitor 53, the signal from capacitor 40 balancing out the minimum signal from tank unit 16 which exists when the tank 10 is empty. Amplifier 33 energizes motor 56 to cause rotation of the motor and movement of wiper arm 52 along potentiometer 51 in a direction to decrease the voltage difference on the input terminals of amplifier 33. When the voltage difference has been reduced to zero, the network is balanced. Amplifier 33 is deenergized and motor 56 stops operating to cease movement of wiper arm 52 along potentiometer 51.

Motor 56 is also connected to a pointer 63, which moves along an indicator dial 64, by means of mechanical connections 61 and 65. Thus an indication of the quantity of fuel in the tank is shown on indicator dial 64.

A more complete description of the just described apparatus may be found in the above identified application to the same inventor.

The following described apparatus has been added to the already described apparatus in order to give an indication of the total quantity of fuel in the tank, including that contained between the various spars 12 and also to control the inflatable bladders 13.

Connected to the mechanical connection 65 from motor 56, and shown to move with indicator needle 63, is a wiper arm 66 connected to a ground terminal 67. Wiper arm 66 moves along either a first conductive strip 70 or a second conductive strip 71. When the fuel in the tank 10 is above a predetermined level wiper arm 66 moves along conductive strip 70. When the fuel level falls below that predetermined level the wiper arm 66 moves along conductive strip 71.

Conductive strip 70 is connected to a relay winding 72 of a pilot relay 73 by a conductor 74. The other terminal of relay coil 72 is connected to a first source of direct voltage, not shown, by means of a conductor 75. A second conductor 76, connected to the direct voltage source, is grounded at a ground terminal 77. Obviously, an alternating voltage source could be used by using an alternating voltage relay or by any other expedient well known to those skilled in the art.

Relay 73 has, in addition to relay winding 72, a movable contact 80, which is shown to be spring biased by a spring 81 to make connection with a fixed contact 82 when the relay winding 72 is deenergized. Movable contact 80 is connected to a ground terminal 83 through a conductor 84.

The second conductive strip 71 is connected to one terminal of a relay winding 85 of a work relay 86 through a conductor 87. The other terminal of relay winding 85 is connected to the direct voltage source through the conductor 75.

Relay 86 has three movable contacts 90, 91 and 92. Movable contact 90 makes connection either with a fixed holding circuit contact 93 or with a fixed dead contact 94. Movable contact 91 makes contact either with a fixed air pressure device energizing contact 95 or a fixed dead contact 96. Movable contact 92 makes contact either with a fixed dead contact 97 or a fixed capacitor adding contact 100. When relay winding 85 is deenergized, movable contact 90 is spring biased by a spring 101 against fixed contact 94, movable contact 91 is spring biased by a spring 102 against fixed contact 96, while movable contact 92 is spring biased by a spring 103 against fixed contact 100. Fixed contact 93 is connected to the lower conductive strip 71 by conductors 87 and 104. Movable contact 90 is connected to fixed contact 82 of relay 73 through a conductor 105. Fixed contact 94 is a dead terminal. Fixed contact 95, which operates in conjunction with movable contact 91, is connected to one terminal of a second direct voltage source, not shown, by a conductor 106. Movable contact 91 is connected for energization of air pressure device 15 through a conductor 107. Fixed contact 96, operated in conjunction with movable contact 91, is a dead terminal. Fixed contact 97, operated in conjunction with movable contact 92, is a dead terminal. Movable contact 92 is connected to a signal adding capacitor 110 by means of a conductor 111. Fixed contact 100, operated in conjunction with movable contact 92, is connected to input terminal 32 of amplifier 33 through conductors 112, 43 and 35. The other terminal of the second direct voltage source to which contact 95 is connected is connected to the second energizing terminal of air pressure device 15 through a conductor 113. Obviously, the two direct voltage sources shown could be the same voltage source and could be alternating voltage sources if desired.

The second plate of capacitor 110 is connected to wiper arm 30 of potentiometer 27 through conductors 31 and 114. Capacitor 110 is chosen to be of such magnitude as to put into the measuring circuit a signal equal to the signal which would be due to the quantity of fuel between the spars 12 if it could be measured.

The operation of the apparatus will now be described.

First let it be assumed that the height of the fuel in tank 10 is at such a level that wiper arm 66 makes contact with conductive strip 70. At this time the bladders 13 are in their deflated position, as shown by the solid lines. The inflated position of the bladders is shown in dotted lines. At this time, relay winding 72 of pilot relay 73 is energized by the following circuit: from the first direct voltage source through conductor 75, relay winding 72, conductor 74, conductive strip 70, wiper arm 66 and ground terminals 67 and 77, the latter of which is connected to the direct voltage source. With relay winding 72 energized, movable contact 80 of relay 73 is moved away from fixed contact 82 and an open circuit results.

With the wiper arm 66 making contact with conductive strip 70 relay winding 85 of work relay 86 is not energized. Thus movable contact 90 makes contact with fixed contact 94, movable contact 91 makes contact with fixed contact 96 and movable contact 92 makes contact with fixed contact 100. Thus, it is seen that capacitor 110 is connected in parallel with tank unit 16 by the following circuits: tank unit 16 is connected to wiper arm 30 of potentiometer 27 through conductor 31 and to the input terminal 32 of amplifier 33 through conductors 34 and 35 while capacitor 110 is connected to wiper arm 30 of potentiometer 27 through conductors 31 and 114 and to the input terminal 32 of amplifier 33 by conductor 111, movable contact 92, fixed contact 100, and conductors 112, 43 and 35. Capacitor 110 by being of the proper magnitude thus provides a signal indication to the input circuit of amplifier 33 indicative of the quantity of fuel in the tank 10 contained between the spars 12. It is therefore seen that an additional signal indicative of the quantity of fuel in the bottom of the tank between the spars is added to the circuit so that the indication on indicator 64 is an indication of the total quantity of fuel in the tank 10.

Now let it be assumed that sufficient fuel has been used up in tank 10 so that wiper arm 66 breaks contact with conductive strip 70 and moves across the dead spot and makes contact with conductive strip 71.

When wiper arm 66 breaks connection with conductive strip 70 relay winding 72 of relay 73 is deenergized and movable contact 80 is spring biased into contact with fixed contact 82. When the wiper arm 66 then makes connection with conductive strip 71 relay winding 85 of work relay 86 is energized by the following circuit: from one terminal of the first direct voltage source through conductor 75, relay winding 85, conductor 87, conductive strip 71, wiper arm 66 and ground terminals 67 and 77, the latter of which is connected to the first direct voltage source. When relay winding 85 is energized movable contact 90 breaks connection with the dead fixed contact 94 and makes connection with fixed holding circuit contact 93. Movable contact 91 breaks connection with the dead fixed contact 96 and makes connection with fixed air pressure device energizing contact 95. Movable contact 92 breaks connection with fixed capacitor adding contact 100 and makes connection with the dead fixed contact 97.

With movable contact 80 of pilot relay 73 making connection with fixed contact 82 and movable contact 90 of work relay 86 making connection with fixed holding circuit contact 93 a holding circuit is created for relay winding 85 through the following circuit: from the first direct voltage source through conductor 75, relay winding 85, conductor 104, fixed contact 93, movable contact 90, conductor 105, fixed contact 82 of relay 73, movable contact 80, conductor 84 and ground terminals 83 and 77 back to the direct voltage source. It is well known that because of change in attitude of a plane in flight the fuel is going to slosh around in the tanks. This would cause small fluctuations of the indicator needle and pointer 66. Therefore, when the fuel quantity is such as to cause pointer 66 to just make contact with conductive strip 71 fuel sloshing will cause the pointer to intermittently move on and off the conductive strip 71. However, the size of the dead spot between the conductive strips is great enough so that pointer 66 will not move back onto strip 70. As a result the holding circuit for energizing relay winding 85 is maintained once pointer 66 has first made contact with conductive strip 71.

With movable contact 91 making connection with fixed air pressure device energizing contact 95 the energizing circuit is completed for air pressure device 15 through the following circuit: from one terminal of the second direct voltage source through conductor 106, fixed contact 95, movable contact 91, conductor 107, to the air pressure device 15 and then from the air pressure device 15 through conductor 113 to the other terminal of the second direct voltage source. When the energizing circuit is completed for the air pressure device 15 bladders 13 are inflated, forcing the fuel between the spars 12 upwardly until all the fuel is above the level of the spars. At the same time that the bladders 13 are being inflated, movable contact 92 is breaking connection with fixed capacitor adding contact 100 to break the circuit from capacitor 110 to amplifier 33, thus taking capacitor 110 out of the measuring circuit.

With bladders 13 inflated, all the fuel is then up about tank unit 16 and is measurable by the tank unit 16. Because capacitor 110 is cut out of the measuring circuit more rapidly than the bladders 13 can be inflated the indicator needle 63 momentarily drops toward zero and then comes back up to indicate the amount of fuel which tank unit 16 measures.

Let the condition when the tank is being refueled now be assumed.

With the fuel level in the tank 10 being low enough so that wiper arm 66 makes connection with conductive strip 71 relay winding 72 of pilot relay 73 is deenergized. However relay winding 85 of work relay 86 is energized so that the bladders 13 are still inflated and capacitor 110 is still out of the measuring circuit. When sufficient fuel has been put into tank 10 so that wiper arm 66 is moved upwardly off conductive strip 71, over the dead spot, and onto conductive strip 70 relay winding 72 of relay 73 is energized to break the connection between movable contact 80 and fixed contact 82. Movement of wiper arm 66 off conductive strip 71 breaks the energizing circuit for relay winding 85 through conductive strip 71. Breaking the connection between movable contact 80 and fixed contact 82 of relay 73 breaks the holding circuit for energizing relay winding 85 and thus relay winding 85 is deenergized. Deenergization of relay winding 85 breaks the energizing connection to the air pressure device 15, permitting the bladders 13 to be deflated and collapse to the bottom of the tank between the spars 12. Also, deenergization of relay winding 85 breaks the connection between movable contact 92 and fixed contact 97 and makes the connection between movable contact 92 and fixed contact 100 to put capacitor 110 back into the measuring circuit. Thus, capacitor 110 will again add into the measuring circuit an indication equivalent to the amount of fuel in the bottom of the tank 10 between the spars 12.

It is thus seen that a small, compact apparatus has been designed which uses a minimum of components in addition to already existing equipment for measuring a quantity of fuel, a portion of which at times cannot actually be measured, while at the same time operating a controlling device for inflating and deflating bladders for enabling use to be made of all the fuel in a tank having an uneven bottom surface.

As modifications may be made by those skilled in the art without departing from the spirit of the invention it is intended that the scope thereof be limited only to the extent of the appended claims.

I claim as my invention:

1. Quantity measuring apparatus for measuring the quantity of a substance in a container having a normally accessible portion and recessed relatively inaccessible bottom portions in which provision is made for forcing the substance bodily out of the bottom portions into said normally accessible portion, said apparatus comprising: sensitive means extending through the normally accessible portion of the container and responsive to the presence of the substance in the container for producing a control effect dependent upon the height of the substance in the normal portion of the container; an indicator; means including said sensitive means for controlling said indicator and causing the same to assume an indicating position corresponding to the height of the substance to which said sensitive means is subjected; further means for modifying the effect of said sensitive means in accordance with the amount of the substance in said normally inaccessible portions so that said indicating means indicates the total amount of the substance including that in said normally inaccessible portions; and means operative when the substance is forced out of said normally inaccessible portions into engagement with said sensitive means to render said further means ineffective to modify the effect of said sensitive means on said indicator.

2. Fuel quantity measuring apparatus for measuring the quantity of fuel in a container having a normally accessible portion and recessed relatively inaccessible bottom portions in which provision is made for forcing the fuel bodily out of the bottom portions into said normally accessible portion when the fuel is needed, said apparatus comprising: fuel sensitive means extending through the normally accessible portion of the container and responsive to the presence of the fuel in the container for producing a control effect dependent upon the height of the fuel in the normal portion of the container; an indicator; means including said fuel sensitive means for controlling said indicator and causing the same to assume an indicating position corresponding to the height of the fuel to which said fuel sensitive means is subjected; further means for modifying the effect of said fuel sensitive means in accordance with the amount of fuel in said normally inaccessible portions so that said indicating means indicates the total amount of fuel including that in said normally inaccessible portions; and means operative when the fuel is forced out of said normally inaccessible portions into engagement with said fuel sensitive means to render said further means ineffective to modify the effect of said sensitive means on said indicator.

3. Fuel quantity measuring apparatus for measuring the quantity of fuel in a container having a normally accessible portion and recessed relatively inaccessible bottom portions in which provision is made for forcing the fuel bodily out of the bottom portions into said normally accessible portion when the fuel is needed, said apparatus comprising in combination: capacity means measuring the quantity of fuel in the normally accessible portion of the container; indicator means; relay means; motor means; means deriving a signal from said capacity means proportional to the quantity of fuel measured and energizingly connected to said motor means and causing operation of said motor means upon change in the quantity of fuel in the container in accordance with the signal derived from said capacity means, said motor means being drivingly connected to said indicator means to indicate the quantity of fuel in the container, said indicator means including means for actuating said relay means upon the fuel level being below a predetermined value; means operated by said relay means when actuated for forcing fuel in the inaccessible bottom portions of the container upwardly into the normally accessible portion of the container such that it can be measured by said capacity means upon actuation of said relay means; a capacitor; and means connecting said capacitor and said relay means and said capacity means such that said capacitor affects the signal derived from said capacity means to the extent of the quantity of the unmeasurable fuel in the inaccessible bottom portions of the container only upon the relay means not being actuated by said indicator means.

4. Fuel quantity measuring apparatus for measuring the quantity of fuel in a container having a normally accessible portion and recessed relatively inaccessible bottom portions in which provision is made for forcing the fuel bodily out of the bottom portions into said normally accessible portion when the fuel is needed, said apparatus comprising in combination: sensitive impedance means measuring the quantity of fuel in the normally accessible portion of the container; indicator means; relay means; motor means; means deriving a signal from said sensitive impedance means proportional to the quantity of fuel measured and energizingly connected to said motor means and causing operation of said motor means upon change in the quantity of fuel in the container in accordance with the signal derived from said impedance means, said motor means being drivingly connected to said indicator means to indicate the quantity of fuel in the container, said indicator means including means for actuating said relay means upon the fuel level being below its predetermined value; means operated by said relay means when actuated for forcing fuel in the inaccessible bottom portions of the container upwardly into the normally accessible portion of the container such that it can be measured by said sensitive impedance means upon energization of said relay means; an impedance; means connecting said impedance and said relay means and said sensitive impedance means such that said impedance affects the signal derived from said sensitive impedance means to the extent of the quantity of the unmeasurable fuel in the inaccessible bottom portions of the container only upon the relay means not being actuated by said indicator means; a holding circuit operated upon actuation of said relay means upon the fuel level being below a first predetermined level for maintaining continued actuation of said relay means despite small fluctuations in fuel level; and means breaking said holding circuit upon the fuel level rising above a second predetermined level.

5. Fuel quantity measuring apparatus for measuring the quantity of fuel in a container having a normally accessible portion and recessed relatively inaccessible bottom portions in which provision is made for forcing the fuel bodily out of the bottom portions into said normally accessible portion when the fuel is needed, said apparatus comprising in combination: capacity means measuring the quantity of fuel in the normally accessible portion of the container; indicator means comprising an indicator dial, a pointer movable along said indicator dial, a conductive member adjacent a portion of said dial at the lower end thereof and a contact member movable with said pointer; relay means comprising a winding and at least two sets of contacts; motor means; means deriving a signal from said capacity means proportional to the quantity of fuel measured and energizingly connected to said motor means and causing operation of said motor means upon change in quantity of fuel in the container in accordance with the signal derived from said capacity means, said motor means being drivingly connected to said pointer and contact member for operation of said pointer and contact member; means connecting a first terminal of said relay winding to said conductive member; means connecting the second terminal of said winding and said contact member to a source of power such that said winding is energized upon said contact member making connection with said conductive member, the fuel level being below a predetermined value; means operated by a first set of relay contacts for forcing fuel in the inaccessible bottom portions of the container upwardly into the normally accessible portion of the container upon actuation of the relay means such that fuel on the bottom portions of the container can be measured by said capacity means; a capacitor; and means connecting said capacitor and a second set of said relay contacts and said capacity means such that said capacitor affects the signal derived from said capacity means to the extent of the quantity of the unmeasurable fuel in the inaccessible bottom portions of the container only upon the relay means not being energized by said indicator means.

6. Fuel quantity measuring apparatus for measuring the quantity of fuel in a container having a normally accessible portion and recessed relatively inaccessible bottom portions in which provision is made for forcing the fuel bodily out of the bottom portions into said normally accessible portion when the fuel is needed, said apparatus comprising in combination: sensitive impedance means measuring the quantity of fuel in the normally accessible portion of the container; indicator means; relay means; motor means; means deriving a signal from said sensitive impedance means proportional to the quantity of fuel measured and energizingly connected to said motor means and causing operation of said motor means upon change in the quantity of fuel in the container in accordance with the signal derived from said impedance means, said motor means being drivingly connected to said indicator means to indicate the quantity of fuel in the container, said indicator means including means for actuating said relay means upon the fuel level being below a predetermined value; means operated by said relay means for forcing fuel in the inaccessible bottom portions of the container upwardly into the normally accessible portion of the container upon the fuel reaching a predetermined low level in the container such that the fuel in the bottom portions of the container can be measured by said sensitive impedance means; an impedance; and means connecting said impedance and said relay means and said sensitive impedance means such that said impedance affects the signal derived from said sensitive impedance means to the extent of the quantity of the unmeasurable fuel in the inaccessible bottom portions of the container only upon the relay means not being actuated by said indicator means.

7. Fuel quantity measuring apparatus for measuring the quantity of fuel in a container having a normally accessible portion and recessed relatively inaccessible bottom portions in which provision is made for forcing the fuel bodily out of the bottom portions into said normally accessible portion when the fuel is needed, said apparatus comprising in combination: capacity means measuring the quantity of fuel in the normally accessible portion of the container; indicator means comprising an indicator dial, a pointer movable along said indicator dial, a conductive member adjacent a portion of said dial at the lower end thereof and a contact member movable with said pointer; motor means; means deriving a signal from said capacity means proportional to the quantity of fuel measured and energizingly connected to said motor means and causing operation of said motor means upon change of quantity of fuel in the container in accordance with the signal derived from said capacity means, said motor means being drivingly connected to said pointer and contact member of said indicator means for operation of said pointer and contact members; first relay means comprising a winding and at least three sets of contacts; means connecting the first terminal of said first relay winding to said conductive member of said indicator means; means connecting the second terminal of said first winding and said contact member of said indicator means to a source of power such that said first winding is energized upon said contact member making connection with said conductive member, the fuel level being below a predetermined value; means operated by a first set of said relay contacts of said first relay means for forcing fuel in the inaccessible bottom portions of the container upwardly into the normally accessible portion of the container upon energization of the first relay winding such that the fuel in the inaccessible bottom portions of the container can be measured by said capacity means; a capacitor; means connecting said capacitor and a second set of said relay contacts of said first relay means and said capacity means such that said capacitor affects the signal derived from said capacity means to the extent of the quantity of the unmeasurable fuel in the inaccessible bottom portions of the container only upon the first relay winding not being energized; circuit holding means operated through a third set of said relay contacts of said first relay means upon energization of said first relay winding for maintaining continued energization of said first relay winding despite said conductive member and said contact member breaking contact upon slight changes in fuel level; second relay means energized upon the fuel in the container being above a predetermined level; and means operated upon energization of said second relay means breaking the holding circuit of said first relay means as the fuel in the container rises above the predetermined level.

8. Fuel quantity measuring apparatus for measuring the quantity of fuel in a container having a normally accessible portion and recessed relatively inaccessible bottom portions in which provision is made for forcing the fuel bodily out of the bottom portions into said normally accessible portion when the fuel is needed, said apparatus comprising in combination: capacity means measuring the quantity of fuel in the normally accessible portion of the container; indicator means comprising an indicator dial, a pointer movable along said indicator dial, a first and a second conductive member adjacent to said dial, the first conductive member being along the lower end of said dial and the second conductive member being along the upper end of said dial, and a contact member movable with said pointer and capable of making contact with either said first or said second conductive member; motor means; means deriving a signal from said capacity means proportional to the quantity of fuel measured and energizingly connected to said motor means and causing operation of said motor means upon change in the quantity of fuel in the container in accordance with the signal derived from said capacity means, said motor means being drivingly connected to said pointer and said contact member of said indicator means for operation of said pointer and said contact member; first relay means comprising a winding and at least three sets of contacts; means connecting a first terminal of said first relay winding to said first conductive member of said indicator means; means connecting the second terminal of said first winding and said contact member of said indicator means to a source of power such that said first winding is energized upon said contact member making connection with said first conductive member, the fuel level being below a predetermined value; means operated by a first set of said relay contacts of said first relay means for forcing fuel in the inaccessible bottom portions of the container upwardly into the normally accessible portion of the container upon energization of the first relay winding such that the fuel in the bottom portions of the container can be measured by said capacity means; a capacitor; means connecting said capacitor and a second set of said relay contacts of said first relay means and said capacity means such that said capacitor affects the signal derived from said capacity means to the extent of the quantity of the unmeasurable fuel in the inaccessible bottom portions of the container only upon the first relay winding not being energized by said indicator means; circuit holding means operated through a third set of said relay contacts of said first relay means upon energization of said relay winding by said indicator means for maintaining continued energization of said first relay winding; second relay means energized upon the fuel in the container being above a predetermined level and said contact member making connection with said second conductive member in said indicator means; and means operated upon energization of said second relay means breaking the holding circuit of said first relay means as the fuel in the container rises above the predetermined level.

References Cited in the file of this patent

UNITED STATES PATENTS

| | | |
|---|---|---|
| 2,213,961 | Hunter, Jr. | Sept. 10, 1940 |
| 2,394,220 | Wagner | Feb. 5, 1946 |
| 2,519,393 | Noyes | Aug. 22, 1950 |
| 2,563,281 | Griffith | Aug. 7, 1951 |